United States Patent
Yang

(10) Patent No.: US 11,690,097 B2
(45) Date of Patent: Jun. 27, 2023

(54) METHOD FOR CONTENTION-BASED RANDOM ACCESS, NETWORK DEVICE AND TERMINAL DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/888,085

(22) Filed: May 29, 2020

(65) Prior Publication Data
US 2020/0296767 A1    Sep. 17, 2020

Related U.S. Application Data

(63) Continuation of application No. PCT/CN2017/110948, filed on Nov. 14, 2017.

(51) Int. Cl.
*H04W 74/08*    (2009.01)
*H04W 76/11*    (2018.01)
*H04W 80/02*    (2009.01)

(52) U.S. Cl.
CPC ... *H04W 74/0808* (2013.01); *H04W 74/0866* (2013.01); *H04W 76/11* (2018.02); *H04W 80/02* (2013.01)

(58) Field of Classification Search
CPC ......... H04W 74/0808; H04W 74/0833; H04W 72/04; H04W 74/004; H04W 74/08;
(Continued)

(56) References Cited

U.S. PATENT DOCUMENTS 9,240,846 B2    1/2016    Koo et al.
10,736,147 B2 *    8/2020    Jung .................. H04W 74/0833
(Continued)

FOREIGN PATENT DOCUMENTS

CN    101998577 A    3/2011
CN    102595636 A    7/2012
(Continued)

OTHER PUBLICATIONS

Nam et al. U.S. Appl. No. 62/579,096, filed Oct. 30, 2017 (Year: 2017).*
(Continued)

*Primary Examiner* — Wutchung Chu
(74) *Attorney, Agent, or Firm* — Perkins Coie LLP

(57) ABSTRACT

Provided are a method for contention-based random access, a network device and a terminal device. The method comprises: a network device receiving, on a first uplink carrier or a second uplink carrier, a first preamble sent by a terminal device, a frequency point of the first uplink carrier being different from a frequency point of the second uplink carrier; and the network device sending to the terminal device a media access control (MAC) protocol data unit (PDU), wherein the MAC PDU comprises a first media access control (MAC) random access response (RAR) corresponding to the first preamble.

11 Claims, 4 Drawing Sheets

(58) Field of Classification Search
CPC . H04W 74/0866; H04W 76/11; H04W 80/02;
H04W 74/006; H04W 72/02; H04W
74/085; H04W 74/002; H04W 72/14;
H04W 36/0061; H04W 52/02; H04W
52/365; H04W 72/042; H04W 52/48;
H04W 72/1284; H04W 56/0015; H04W
72/1289; H04W 74/008; H04W 72/12;
H04W 52/146; H04W 16/14; H04W
24/10; H04L 5/00; H04L 5/001; H04L
25/03866; H04L 5/0005; H04L 5/0053;
H04L 1/00; H04L 5/0048; H04L 5/0094;
H04L 5/0091; H04B 17/373; H04B
7/0695; H04B 7/024

See application file for complete search history.

(56) References Cited

U.S. PATENT DOCUMENTS

| | | | |
|---|---|---|---|
| 2012/0300714 A1 | 11/2012 | Ng et al. | |
| 2012/0314652 A1* | 12/2012 | Ahn | H04W 56/0045 370/328 |
| 2014/0010214 A1* | 1/2014 | Hooli | H04W 72/0446 370/336 |
| 2014/0341163 A1* | 11/2014 | Zhang | H04B 7/024 370/329 |
| 2015/0319638 A1 | 11/2015 | Rune | |
| 2015/0334748 A1* | 11/2015 | Yu | H04W 74/004 370/328 |
| 2016/0295575 A1 | 10/2016 | Dinan | |
| 2016/0302225 A1 | 10/2016 | Damnjanovic et al. | |
| 2017/0094690 A1* | 3/2017 | Zhang | H04W 74/002 |
| 2018/0167980 A1* | 6/2018 | Shi | H04L 1/00 |
| 2018/0359784 A1* | 12/2018 | Agiwal | H04W 72/23 |
| 2019/0014598 A1* | 1/2019 | Yoshimura | H04W 16/14 |
| 2019/0110314 A1* | 4/2019 | Abedini | H04W 72/23 |
| 2019/0132764 A1* | 5/2019 | Nam | H04W 28/0263 |
| 2019/0132882 A1* | 5/2019 | Li | H04W 74/0833 |
| 2019/0335512 A1* | 10/2019 | Shi | H04W 74/02 |
| 2020/0037360 A1* | 1/2020 | Qian | H04B 7/0695 |
| 2020/0100300 A1* | 3/2020 | Xie | H04W 88/02 |
| 2020/0107373 A1* | 4/2020 | Roy | H04L 43/18 |
| 2020/0128557 A1* | 4/2020 | Suzuki | H04W 72/23 |
| 2020/0128582 A1* | 4/2020 | Chen | H04W 74/0833 |
| 2020/0137703 A1* | 4/2020 | Liu | H04W 56/0005 |
| 2020/0146042 A1* | 5/2020 | Suzuki | H04W 8/24 |
| 2020/0178314 A1* | 6/2020 | Liu | H04W 72/0466 |
| 2020/0221508 A1* | 7/2020 | Huang | H04W 74/006 |
| 2020/0404712 A1* | 12/2020 | Christoffersson | H04W 74/0833 |
| 2021/0099906 A1* | 4/2021 | Nam | H04W 76/11 |
| 2021/0105813 A1* | 4/2021 | Lee | H04W 76/27 |

FOREIGN PATENT DOCUMENTS

| | | | |
|---|---|---|---|
| CN | 102668440 A | 9/2012 | |
| CN | 103583071 A | 2/2014 | |
| CN | 105409135 A | 3/2016 | |
| CN | 106358301 A | 1/2017 | |
| EP | 3223573 B1 * | 3/2019 | H04W 52/06 |
| WO | 2016206497 A1 | 12/2016 | |
| WO | WO-2017028273 A1 * | 2/2017 | H04L 1/00 |

OTHER PUBLICATIONS

"Content of RAR," Huawei, HiSilicon—3GPP TSG-RAN WG2 #99, R2-1708970; Aug. 12, 2017—Berlin, Germany, Aug. 21-25, 2017 (3 pages).
"Random Access in NR: RAR MAC PDU Design," Samsung—3GPP TSG-RAN WG2 #99, R2-1707683; Aug. 2, 2017—Berlin, Germany, Aug. 21-25, 2017, Samsung (4 pages).
"RAR reception for multiple Msg1 transmissions," Huawei, HiSilicon—3GPP TSG-RAN WG2 Meeting #99I, R2-1709257; Aug. 12, 2017—Berlin, Germany, Aug. 21-25, 2017 (4 pages).
International Search Report dated Jul. 25, 2018 of PCT/CN2017/110948 (4 pages).
Notification to Go Through Registration Formalities dated May 7, 2020 of Chinese Application No. 201780057714.8 (2 pages).
Notification to Grant Patent Right for Invention dated May 7, 2020 of Chinese Application No. 201780057714.8 (3 pages).
The First Office Action dated Dec. 3, 2019 of Chinese Application No. 201780057714.8 (19 pages).
The Second Office Action dated Feb. 14, 2020 of Chinese Application No. 201780057714.8 (17 pages).
3GPP TS 36.321 V14.4.0 (Sep. 2017)—3rd Generation Partnership Project Technical Specification Group Radio Access Network; Evolved Universal Terrestrial Radio Access (E-UTRA); Medium Access Control (MAC) protocol specification (Release 14) (108 pages).
3GPP TSG RAN WG1 Meeting #90bis—Prague, Czech Republic, Oct. 9-13, 2017—R1-1717036—ZTE, Sanechips, Remaining details of RACH procedure (25 pages).
3GPP TSG RAN WGI Meeting 90bis—Prague, Czech Republic, Oct. 9-13, 2017—RI-1717901—Huawei, HiSilicon, Remaining issues on the PRACH for SUL (5 pages).
3GPP TSG-RAN WG2 Meeting#96—Reno, USA, Nov. 14-18, 2016—R2-167682—ZTE, Remaining issues on multi-carrier PRACH in NB-IoT (6 pages).
Supplementary European Search Report dated Sep. 11, 2020 of European Application No. 17931841.5 (8 pages).
Examination Report for Indian Application No. 202017023466 dated Sep. 22, 2021. 5 pages with English translation.
First Office Action for Chinese Application No. 202010696718.4 dated Oct. 28, 2021. 7 pages with English translation.
Ahmadi, S. "Chapter 8: 8.9.2 Contention-free RACH procedure" LTE-Advanced—A Practical Systems Approach to Understanding 3GPP LTE Releases 10 and 11 Radio Access Technologies; Academic Press, 2013; pp. 394-395.
Chen et al. "Research of Random Access Procedure in LTE System" Wide Band Network; 2011; 68-70. English translation provided.
Extended European Search Report for European Application No. 21191065.8 dated Dec. 16, 2021. 10 pages.
MediaTek Inc. "Support Initial Access on Supplementary Uplink" R2-1708050; 3GPP TSG-RAN WG2 Meeting #99; Berlin, Germany; Aug. 21-25, 2017. 3 pages.
Second Office Action for Chinese Application No. 202010696718.4 dated Feb. 23, 2022. 16 pages with English translation.

* cited by examiner

METHOD FOR CONTENTION-BASED RANDOM ACCESS, NETWORK DEVICE AND TERMINAL DEVICE

CROSS-REFERENCE TO RELATED APPLICATION

The present application is a continuation application of International Application No. PCT/CN2017/110948, filed on Nov. 14, 2017, the entire disclosure of which is hereby incorporated by reference.

TECHNICAL FIELD

Implementations of the present disclosure relate to the communication field, and more particularly, to a method for contention-based random access, a network device and a terminal device.

BACKGROUND

With people's pursuit of rate, delay, high-speed mobility, energy efficiency and diversity and complexity of services in future life, International Organization for Standardization of 3rd generation partnership project (3GPP) began to research and develop the fifth generation mobile communication technology (5-Generation, 5G). In the early deployment of New Radio (NR), a full NR coverage is difficult to obtain, so a typical network coverage is a mode of Long Term Evolution (LTE) coverage in a wide area and NR island coverage. Moreover, as the most LTE is deployed below 6 GHz, there is very little spectrum below 6 GHz that can be used for the 5G. Therefore, the NR has to research spectrum applications above 6 GHz, however for high frequency band, its coverage is limited and its signal fading is fast.

In the prior art, since the uplink power of the terminal device is limited and frequencies of an NR spectrum (having high frequencies and high propagation loss) are high, the uplink coverage is limited. To improve the uplink coverage, a LTE spectrum (relatively low frequency) is used as a secondary uplink spectrum (i.e., there is a secondary uplink carrier), which can improve the uplink coverage.

However, due to introduction of the secondary uplink carrier, the terminal device has only one downlink carrier and two uplink carriers, so when performing a contention-based random access, the terminal device needs to distinguish that a downlink Random Access Response (RAR) corresponds to an RAR of a preamble on which uplink (UL). Since Physical Random Access Channel (PRACH) resources on the two carriers are configured independently, the preamble is also configured independently (indexes 0 to 63), that is, both the preamble and RA-RNTI (determined based on PRACH resources) may conflict, the terminal device may not be able to distinguish the UL carrier on which the RAR of the preamble is sent when the terminal device receives a first Media Access Control (MAC) RAR. That is, it is possible that two carriers multiplex an RAR.

SUMMARY

Provided are a method for contention-based random access, a network device and a terminal device.

In a first aspect, a method for contention-based random access is provided. The method includes: a network device receives a first preamble sent by a terminal device on a first uplink carrier or a second uplink carrier, wherein a frequency point of the first uplink carrier is different from a frequency point of the second uplink carrier; and the network device sends a media access control (MAC) protocol data unit (PDU) to the terminal device, wherein the MAC PDU includes a first MAC random access response (RAR) corresponding to the first preamble. The method in the implementations of the present disclosure can enable a terminal device to effectively distinguish that a received first MAC RAR is an RAR of a preamble sent on which uplink carrier.

In some possible implementations, an index number of a preamble transmittable on the first uplink carrier has no intersection with an index number of a preamble transmittable on the second uplink carrier.

In some possible implementations, the index number of the preamble transmittable on the first uplink carrier and the index number of the preamble transmittable on the second uplink carrier are configured in a system broadcast.

In some possible implementations, the MAC PDU includes indication information for indicating that the first MAC RAR is an RAR corresponding to the first preamble sent on the first uplink carrier, or indication information for indicating that the first MAC RAR is an RAR corresponding to the first preamble sent on the second uplink carrier.

In some possible implementations, the MAC PDU includes a MAC header carrying the indication information.

In some possible implementations, the MAC header includes a backoff indicator (BI) subheader carrying the indication information.

In some possible implementations, the MAC header includes a random access preamble identifier (RAPID) subheader carrying the indication information.

In some possible implementations, the MAC header includes a backoff indicator (BI) subheader.

In some possible implementations, the BI subheader includes a first BI and/or a second BI; the first BI is used for indicating waiting time before the terminal device re-sends a preamble on the first uplink carrier, and the second BI is used for indicating waiting time before the terminal device re-sends a preamble on the second uplink carrier.

In some possible implementations, the MAC PDU includes the first MAC RAR carrying the indication information.

In some possible implementations, a random access radio network temporary identifier (RA-RNTI) corresponding to a physical random access channel (PRACH) resource on the first uplink carrier has no intersection with an RA-RNTI corresponding to a PRACH resource on the second uplink carrier.

In a second aspect, a method for contention-based random access is provided. The method includes: a terminal device sends a first preamble to a network device on a first uplink carrier or a second uplink carrier, wherein a frequency point of the first uplink carrier is different from a frequency point of the second uplink carrier; and the terminal device receives a media access control (MAC) protocol data unit (PDU) sent by the network device, wherein the MAC PDU includes a first MAC random access response (RAR) corresponding to the first preamble.

In some possible implementations, an index number of a preamble transmittable on the first uplink carrier has no intersection with an index number of a preamble transmittable on the second uplink carrier.

In some possible implementations, the index number of the preamble transmittable on the first uplink carrier and the index number of the preamble transmittable on the second uplink carrier are configured in a system broadcast.

In some possible implementations, the MAC PDU includes indication information for indicating that the first MAC RAR is an RAR corresponding to the first preamble sent on the first uplink carrier, or indication information for indicating that the first MAC RAR is an RAR corresponding to the first preamble sent on the second uplink carrier.

In some possible implementations, the MAC PDU includes a MAC header carrying the indication information.

In some possible implementations, the MAC header includes a backoff indicator (BI) subheader carrying the indication information.

In some possible implementations, the MAC header includes a random access preamble identifier (RAPID) subheader carrying the indication information.

In some possible implementations, the MAC header includes a backoff indicator (BI) subheader.

In some possible implementations, the BI subheader includes a first BI and/or a second BI; the first BI is used for indicating waiting time before the terminal device re-sends a preamble on the first uplink carrier, and the second BI is used for indicating waiting time before the terminal device re-sends a preamble on the second uplink carrier.

In some possible implementations, the MAC PDU includes the first MAC RAR carrying the indication information.

In some possible implementations, the method further includes: the terminal device determines whether the first MAC RAR is a MAC RAR of the terminal device according to the indication information; when the first MAC RAR is the MAC RAR of the terminal device, the terminal device performs a random access according to the first MAC RAR.

In some possible implementations, a random access radio network temporary identifier (RA-RNTI) corresponding to a physical random access channel (PRACH) resource on the first uplink carrier has no intersection with an RA-RNTI corresponding to a PRACH resource on the second uplink carrier.

In a third aspect, a network device is provided. The network device includes a receiving unit and a sending unit.

The receiving unit is configured to receive a first preamble sent by a terminal device on a first uplink carrier or a second uplink carrier, wherein a frequency point of the first uplink carrier is different from a frequency point of the second uplink carrier.

The sending unit is configured to send a media access control (MAC) protocol data unit (PDU) to the terminal device, wherein the MAC PDU includes a first MAC random access response (RAR) corresponding to the first preamble.

In a fourth aspect, a network device is provided. The network device includes a transceiver configured to receive a first preamble sent by a terminal device on a first uplink carrier or a second uplink carrier, wherein a frequency point of the first uplink carrier is different from a frequency point of the second uplink carrier; and send a media access control (MAC) protocol data unit (PDU) to the terminal device, wherein the MAC PDU includes a first MAC random access response (RAR) corresponding to the first preamble.

In a fifth aspect, there is provided a terminal device. The terminal device includes a sending unit and a receiving unit.

The sending unit is configured to send a first preamble to a network device on a first uplink carrier or a second uplink carrier, wherein a frequency point of the first uplink carrier is different from a frequency point of the second uplink carrier.

The receiving unit is configured to receive a media access control (MAC) protocol data unit (PDU) sent by the network device, wherein the MAC PDU includes a first MAC random access response (RAR) corresponding to the first preamble.

In a sixth aspect, a terminal device is provided. The terminal device includes a transceiver configured to send a first preamble to a network device on a first uplink carrier or a second uplink carrier, wherein a frequency point of the first uplink carrier is different from a frequency point of the second uplink carrier; and receive a media access control (MAC) protocol data unit (PDU) sent by the network device, wherein the MAC PDU includes a first MAC random access response (RAR) corresponding to the first preamble.

In a seventh aspect, there is provided a computer readable medium for storing a computer program. The computer program includes instructions used for executing the method implementations of the above first aspect or the second aspect.

In an eighth aspect, a computer chip is provided. The computer chip includes an input interface, an output interface, at least one processor, and a memory. The at least one processor is used for executing codes in the memory. When the codes are executed, the processor may implement various processes executed by the network device in the method for contention-based random access of the first aspect or the second aspect.

In a ninth aspect, a computer chip is provided. The computer chip includes an input interface, an output interface, at least one processor, and a memory. The at least one processor is used for executing codes in the memory. When the codes are executed, the processor may implement various processes executed by the terminal device in the method for contention-based random access of the first aspect or the second aspect.

In a tenth aspect, there is provided a communication system including the aforementioned network device and terminal device.

DETAILED DESCRIPTION

Figure 1:
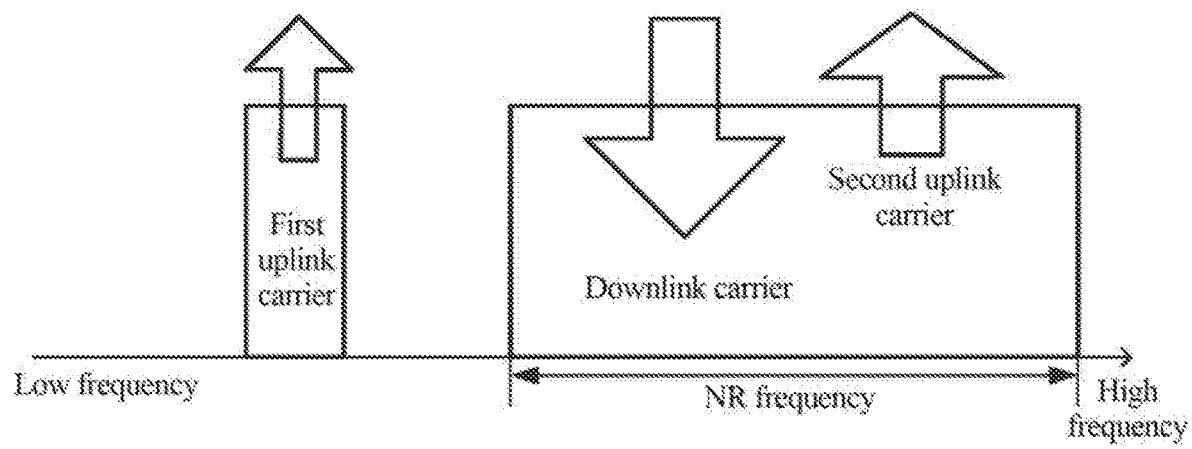
FIG. 1 is an example of an application scenario of the present disclosure.

FIG. 1 is an example of an application scenario according to an implementation of the present disclosure.

As shown in FIG. 1, the terminal device may have one downlink carrier and two uplink carriers (as shown in FIG. 1, a first uplink carrier and a second uplink carrier). Specifically, the first uplink carrier and the downlink carrier may be carriers in an NR high frequency band, and the second uplink carrier may be a carrier in an LTE low frequency band. It should be understood that the terminal device, shown in FIG. 1, having two uplink carriers is for illustrative description only, and the implementations of the present disclosure are not specifically limited thereto. For example, the terminal device may also support three uplink carriers, etc.

It should be understood that a motivation for introducing the second uplink carrier is to improve the uplink coverage of the NR high frequency band.

Specifically, since the uplink power of the terminal device is limited and frequencies of an NR spectrum (having high frequencies and high propagation loss) are high, the uplink coverage of the NR is limited. By using an LTE spectrum (having relatively low frequencies) as a secondary uplink carrier, the uplink coverage effect can be improved.

For example, a combination of the first uplink carrier and the second uplink carrier may be similar to carrier aggregation (CA) in the LTE, except that there is no paired downlink. That is, from a perspective of band combination, the second uplink carrier is a cell with only uplink and no paired downlink, but its uplink is controlled by a certain downlink carrier, in other words, when the second uplink carrier is configured, the second uplink carrier is a secondary service cell (SCell) without downlink, and the control of the second uplink carrier depends on a primary service cell (PCell).

It should be understood that implementations of the present disclosure may be applied to any communication system including multiple uplinks. For example, the first communication system and the second communication system may be various communication systems, e.g., a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Time Division Duplex (TDD) system, and a Universal Mobile Telecommunication System (UMTS) system.

In addition, the present disclosure describes various implementations in combination with network devices (first to fourth network devices) and a terminal device.

The network device may refer to any entity, at a network side, for sending or receiving signals. For example, the network device may be a user device for machine type communication (MTC), a Base Transceiver Station (BTS) in a GSM or CDMA, a NodeB in a WCDMA, an Evolutional Node B (eNB or eNodeB) in an LTE, a base station device in a 5G network, etc.

The terminal device may be any terminal device. Specifically, the terminal device may communicate with one or more core networks through a radio access network (RAN), and may also be referred to as an access terminal, a User Equipment (UE), a subscriber unit, a subscriber station, a mobile station, a rover station, a remote station, a remote terminal, a mobile device, a user terminal, a terminal, a wireless communication device, a user agent, or a user device. For example, the terminal device may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, an on-board device, a wearable device, a terminal device in a 5G network or the like.

Contention-based random access in the implementation of the present disclosure will be described below with reference to FIG. 2.

Figure 2:
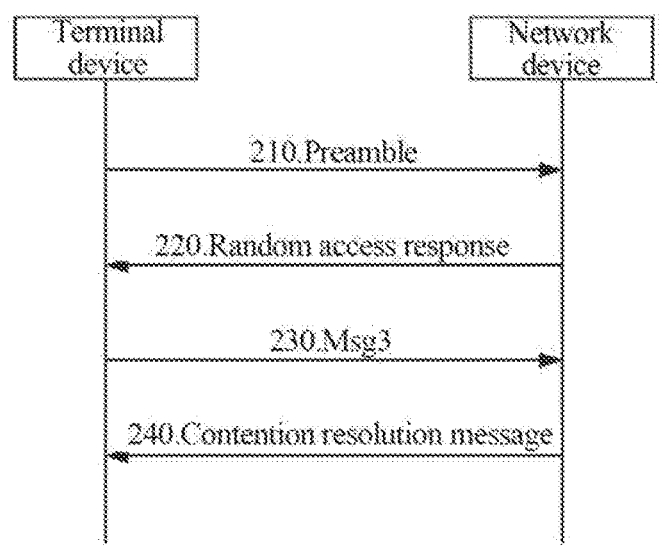
FIG. 2 is a schematic flowchart of a method for contention-based random access according to an implementation of the present disclosure.

FIG. 2 is a schematic flowchart of contention-based random access according to an implementation of the present disclosure.

It should be understood that after the cell search procedure, a terminal device has already obtained downlink synchronization with a cell, so the terminal device can receive downlink data. However, the terminal device can perform uplink transmission when it obtains uplink synchronization with the cell. The terminal device establishes a connection with the cell and obtains uplink synchronization with the cell through a Random Access Procedure.

Main purposes of random access are: (1) to obtain uplink synchronization; (2) to assign a unique identifier C-RNTI to the terminal device.

As shown in FIG. 2, in an implementation of the present disclosure, the contention-based random access procedure includes the following acts 210-240.

In 210, a terminal device sends a preamble to a network device, to inform the network device that there is a random access request, and to enable the network device to estimate a transmission delay between the network device and the terminal device and calibrate uplink timing according to the transmission delay.

Specifically, the terminal device selects a preamble index and a Physical Random Access Channel (PRACH) resource for sending a preamble; thus, the preamble is transmitted in the PRACH.

Herein, the network device will notify all terminal devices through a broadcast System Information Block (SIB), for example, SIB2, that preambles are allowed to be transmitted on which resources. Further, each PRACH resource occupies a bandwidth of 6 consecutive resource blocks (RBs) in a frequency domain, which is exactly equal to a minimum uplink bandwidth supported by the LTE. Therefore, the same RA preamble structure may be used no matter how large the transmission bandwidth of the cell is. In addition, each cell has 64 available preamble sequences, and the terminal device will select one (or designated by the network device) to transmit in the PRACH. These sequences may be divided into two parts, one for contention-based random access and the other for non-contention-based random access.

In 220, the network device sends a Random Access Response (RAR) to the terminal device.

Specifically, after sending a preamble, the terminal device will monitor a corresponding physical downlink control channel (PDCCH) according to a random access radio network temporary identifier (RA-RNTI) value within an RAR time window, to receive an RAR corresponding to the RA-RNTI. If no RAR replied by the network device is received within the RAR time window, then it is considered that this random access procedure have failed. It should be understood that the RA-RNTI with which the terminal device descrambles the RAR is not transmitted in an air interface, but both the terminal device and the eNB need to uniquely determine the value of RA-RNTI, otherwise the terminal device cannot decode the RAR, so the value of RA-RNTI must be calculated through a time-frequency position of the preamble that is known clearly by both the transmitter and the receiver.

Specifically, the RA-RNTI associated with the preamble is calculated by the following formula:

RA-RNTI=1+t_id+10*f_id where t_id represents a number (0≤t_id<10) of a first subframe where a PRACH sending a preamble is located, and f_id represents an index (0≤f_id<6) of the PRACH sending the preamble in the frequency domain. For FDD, there is only one PRACH resource per subframe, therefore, f_id is fixed to be 0. In other words, since a time-frequency position of the preamble sent by the terminal device is determined, the network device also obtains the time-frequency position of the preamble when decoding the preamble, and thus the network device knows the RA-RNTI needed to be used in an RAR. When the terminal device successfully receives an RAR (decoded using the determined RA-RNTI) and the preamble index in the RAR is the same as the preamble index sent by the terminal device, it is considered that the RAR has been successfully received, and in this case the terminal device may stop monitoring the RAR.

In 230, the terminal device sends a message 3 (Msg3) to the network device, and the terminal device will carry its own unique identifier in the Msg3, for example, a Cell Radio Network Temporary Identifier (C-RNTI), or, for example, a terminal device identifier (S-TMSI or a random number) from a core network.

In 240, the network device sends a contention resolution message to the terminal device.

Specifically, in a content resolution mechanism, the network device will carry a unique identifier of a winning terminal device in the contention resolution message (Msg4). And, other terminal devices that did not win in the contention resolution will re-initiate random access.

It should be understood that the contention-based random access shown in FIG. 2 may also be applied in the scenario shown in FIG. 1. Specifically, a network device receives a first preamble sent by a terminal device on a first uplink carrier or a second uplink carrier, and a frequency point of the first uplink carrier is different from that of the second uplink carrier; and the network device sends a media access control (MAC) protocol data unit (PDU) to the terminal device, and the MAC PDU includes a first MAC RAR corresponding to the first preamble. In other words, a terminal device sends a first preamble to a network device on a first uplink carrier or a second uplink carrier, and a frequency point of the first uplink carrier is different from that of the second uplink carrier; and the terminal device receives a MAC PDU sent by the network device, and the MAC PDU includes a first MAC RAR corresponding to the first preamble.

In combination with the contention-based random access procedure performed by the terminal device, it can be found that when a terminal device has multiple uplink carriers, for example, two uplink carriers, a PRACH resource will exist on both carriers. However, since there is only one downlink, when receiving an RAR, the terminal device needs to distinguish that the downlink RAR corresponds to a response to a preamble on which uplink carrier. Since PRACH resources on two carriers are configured independently, preambles are also configured independently (indexes 0 to 63), and RA-RNTIs (determined based on PRACH resources) based on which downlink RARs are received may conflict, regarding a RAR in a MAC RAR, it may not be distinguished that a preamble is sent on which uplink carrier.

To solve the above problems, an implementation of the present disclosure provides a method for contention-based random access, which can enable the terminal device to effectively distinguish that the received first MAC RAR is an RAR of a preamble sent on which uplink carrier.

To facilitate understanding of the solution, information carried by the RAR will be introduced from a perspective of composition of a MAC PDU including the RAR.

Figure 3:
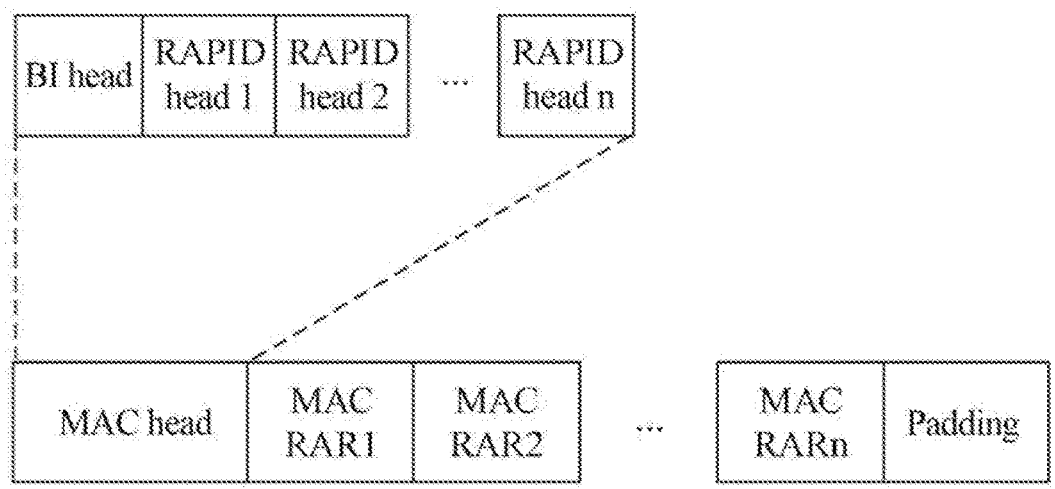
FIG. 3 is a schematic block diagram of a MAC PDU according to an implementation of the present disclosure.

As shown in FIG. 3, a MAC PDU is composed of a MAC header and MAC RARs.

Specifically, as shown in FIG. 3, the MAC PDU is composed of one MAC header, one or more MAC RARs (MAC Random Access Responses) and padding bits that may be present.

Note: a difference between the MAC PDU and the MAC RAR is that one MAC PDU contains one or more MAC RARs.

It can be seen from the structure of MAC PDU that if the network device detects random access requests from multiple terminal devices in the same PRACH resource, the network device can respond to these access requests by using one MAC PDU, and the response to each random access request (corresponding to one preamble index) corresponds to one RAR. In other words, if multiple terminal devices send preambles in the same PRACH resource (the same time-frequency position, the same RA-RNTI is used), corresponding RARs are multiplexed in the same MAC PDU.

The MAC PDU is transmitted in the DL-SCH and is indicated by the PDCCH scrambled with the RA-RNTI.

That is, all terminal devices that send preambles (not necessarily same) using the same PRACH resource monitor the PDCCH scrambled with the same RA-RNTI and receive the same MAC PDU, but different preamble indexes correspond to different RARs.

Since the MAC PDU can only be scrambled with one RA-RNTI, this also means RARs corresponding to preambles sent using different PRACH resources (different time-frequency positions) cannot be multiplexed into the same MAC PDU.

Through the above analysis, it can be found that if an RA-RNTI corresponding to a PRACH resource on the first uplink carrier has no intersection with an RA-RNTI corresponding to a PRACH resource on the second uplink carrier, or, if an index number of a preamble transmittable on the first uplink carrier has no intersection with an index number of a preamble transmittable on the second uplink carrier, the terminal device can effectively avoid RAR conflicts, that is, the terminal device can effectively distinguish that the received MAC RAR is a response to a preamble sent on which uplink carrier.

Therefore, in an implementation of the present disclosure, a method for configuring resources for contention-based random access is provided.

In one implementation, a method for configuring RA-RNTI is provided to avoid conflicts of the RA-RNTI corresponding to the first uplink carrier and the RA-RNTI corresponding to the second uplink carrier.

Specifically, as shown in FIG. 3, if preambles are sent on the same PRACH resource (using the same RA-RNTI), corresponding RARs are multiplexed in the same MAC PDU. If an RA-RNTI corresponding to a PRACH resource on the first uplink carrier has no intersection with an RA-RNTI corresponding to a PRACH resource on the second uplink carrier, the terminal device can effectively distinguish that all the MAC RARs in the received MAC PDUs are responses to preambles sent on which uplink carriers. In other words, when PRACH resources are configured for two uplink (UL) carriers, it can be ensured that RA-RNTIs corresponding to PRACH resources of the two carriers do not conflict.

That is, the terminal device can distinguish the RARs, i.e., responses, to preambles sent on different uplink carriers through the RA-RNTI.

In another implementation, a method for configuring a preamble is provided to avoid a conflict between preambles transmittable on the first uplink carrier and preambles transmittable on the second uplink carrier.

Specifically, as shown in FIG. 3, each Random Access Preamble Identifier (RAPID) corresponds to a RAR of a random access request. If an index number of a preamble transmittable on the first uplink carrier has no intersection with an index number of a preamble transmittable on the second uplink carrier, the terminal device can effectively distinguish that the received MAC RAR is a response to a preamble sent on which uplink carrier.

For example, preamble sequences with preamble indexes of 0 to 20 are sent on the first uplink carrier, and preamble sequences with preamble indexes of 21 to 63 are preamble sequences on the second uplink carrier. Thus, even if RA-RNTIs corresponding to PRACH resources corresponding to different uplink carriers conflict, the terminal device can still distinguish RARs corresponding to preambles sent by different carriers.

Further, in an implementation of the present disclosure, the index number of the preamble transmittable on the first uplink carrier and the index number of the preamble transmittable on the second uplink carrier are configured in a system broadcast, for example, SIB2.

Therefore, when the terminal device determines to send the preamble to the network device on the first uplink carrier, the terminal device selects an index number of a preamble from the index numbers of the preambles transmittable on the first uplink carrier according to a system broadcast message. When the terminal device determines to send the preamble to the network device on the second uplink carrier, the terminal device selects an index number of the preamble from the index numbers of the preambles transmittable on the second uplink carrier according to a system broadcast message.

It should be understood that the preamble indexes transmittable on the above uplink carriers are for only an exemplary description, and implementations of the present disclosure are not limited thereto.

It should also be understood that in the implementation of the present disclosure, the RA-RNTI corresponding to the PRACH resource on the first uplink carrier may be distinguished from the RA-RNTI corresponding to the PRACH resource on the second uplink carrier; or, the preamble transmittable on the first uplink carrier is distinguished from the preamble transmittable on the second uplink carrier, thereby avoiding a case in which the terminal device cannot distinguish that the received MAC RAR is a response to a preamble sent on which uplink carrier. However, implementations of the present disclosure are not limited thereto. For example, the terminal device may also make no changes to both the configuration of preamble and the configuration of RA-RNTI.

In an implementation of the present disclosure, a method for indicating a terminal device is further provided, so that the network device can indicate whether the first MAC RAR received by the terminal device is an RAR corresponding to the first preamble sent on the first uplink carrier or an RAR corresponding to the first preamble sent on the second uplink carrier.

Specifically, the MAC PDU may include indication information for indicating that the first MAC RAR is an RAR corresponding to the first preamble sent on the first uplink carrier, or indication information for indicating that the first MAC RAR is an RAR corresponding to the first preamble sent on the second uplink carrier.

A carrying position of the indication information in the implementation of the present disclosure will be described below by way of example with reference to FIG. 3.

As shown in FIG. 3, one MAC header contains one or more MAC subheaders. Except for a Backoff Indicator subheader, each subheader corresponds to a RAR.

Figure 4:
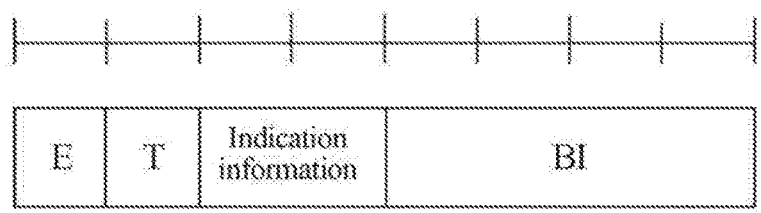
FIG. 4 is a schematic block diagram of carrying indication information in a BI header according to an implementation of the present disclosure.

In one implementation, as shown in FIG. 4, the MAC header includes a backoff indicator (BI) subheader carrying the indication information. One or two reserved bits in the BI subheader are used for indicating a UL carrier index. In this case, this MAC RAR can only belong to one UL carrier, and there is no situation where two carriers multiplex the RAR.

For a BI subheader, the BI subheader occurs only once and is located at a first subheader of the MAC header. If the terminal device receives a BI subheader, the terminal device will save a Backoff value equal to the BI value in the subheader; otherwise, the terminal device will set the Backoff value to be 0. The BI (Backoff Indicator) indicates a time range needed to wait before the terminal device re-sends a preamble. If the terminal device does not receive an RAR within an RAR time window, or none of the RARs received matches with its own preamble, then it is considered that this RAR reception has failed. In this case, the terminal device needs to wait for a period of time before re-initiating a random access. The waiting time is a random value selected within a waiting time interval specified from 0 to BI.

It should be noted that the waiting time, designated by the BI, before the terminal device re-sends a preamble may conflict with physical layer timing.

In the implementation of the present disclosure, how to select a subframe to send the preamble may depend on implementations of the terminal device, or the physical layer timing is only "ready" to send, and the actual sending time is determined by the MAC layer. Implementations of the present disclosure are not specifically limited thereto.

Figure 5:
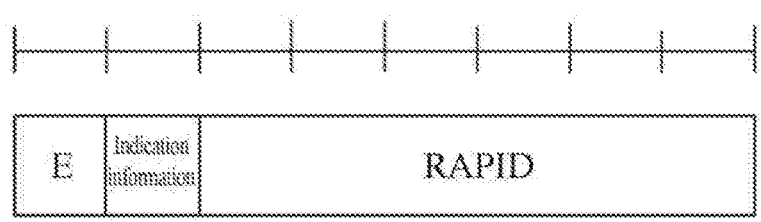
FIG. 5 is a schematic block diagram of carrying indication information in a RAPID header according to an implementation of the present disclosure.

In another implementation, as shown in FIG. 5, the MAC header includes a Random Access Preamble Identifier (RAPID) subheader carrying the indication information.

The Random Access Preamble Identifier (RAPID) is a preamble index obtained when the network device detects the preamble. If the terminal device finds that the value is the same as the index used when sending the preamble, it is considered that the corresponding RAR has been successfully received.

It should be understood that since the RAPID subheader carries the indication information, the indication information occupies the bits in the original format for indicating whether the terminal device has a BI subheader.

Further, in an implementation of the present disclosure, the MAC header includes a backoff indicator (BI) subheader. In this case, the BI subheader is required to be sent whenever possible. If no backoff is required, the BI value is set to be 0.

Further, the BI subheader includes a first BI and/or a second BI; the first BI is used for indicating waiting time before the terminal device re-sends a preamble on the first uplink carrier, and the second BI is used for indicating waiting time before the terminal device re-sends a preamble on the second uplink carrier.

That is, the BI is required to represent the backoff values of two UL carriers.

Figure 6:
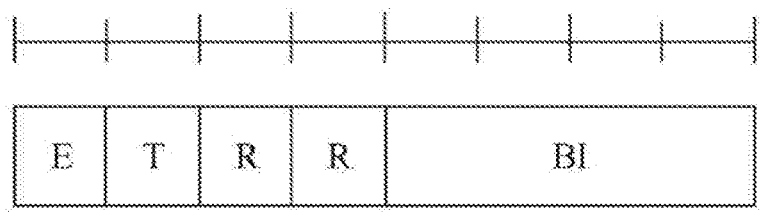
FIG. 6 is a schematic block diagram of a BI header when indication information is carried in a RAPID header according to an implementation of the present disclosure.

In an implementation of the present disclosure, as shown in FIG. 6, the format of BI subheader may keep unchanged.

In particular, SUL is generally used at the edge of a cell, with relatively few users. As long as PRACH is configured sufficiently, there is no requirement of backoff. Therefore, it can be specified by a protocol that the random access of an SUL carrier does not support BI backoff.

In an implementation of the invention, the format of the BI subheader may also be re-configured.

Figure 7:
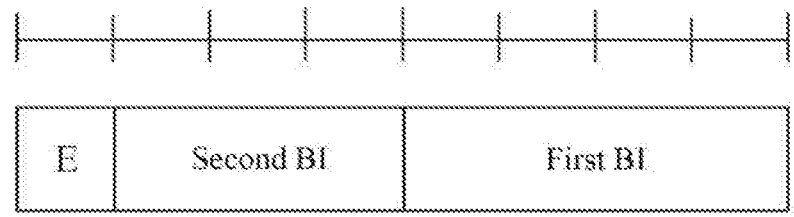
FIG. 7 is another schematic block diagram of a BI header when indication information is carried in a RAPID header according to an implementation of the present disclosure.

For example, as shown in FIG. 7, a BI value of 3 bits is the first BI used for representing the backoff value of the SUL carrier, and a BI value of 4 bits is the second BI used for representing the backoff value of NR UL.

In another implementation, the MAC PDU includes a first MAC RAR carrying the indication information. That is, the MAC RAR is modified to be capable of distinguishing different carrier information. Specifically, carrier index information (e.g., 0 or 1) is added to the MAC RAR, where 0 represents the SUL and 1 represents the NR UL.

Figure 8:
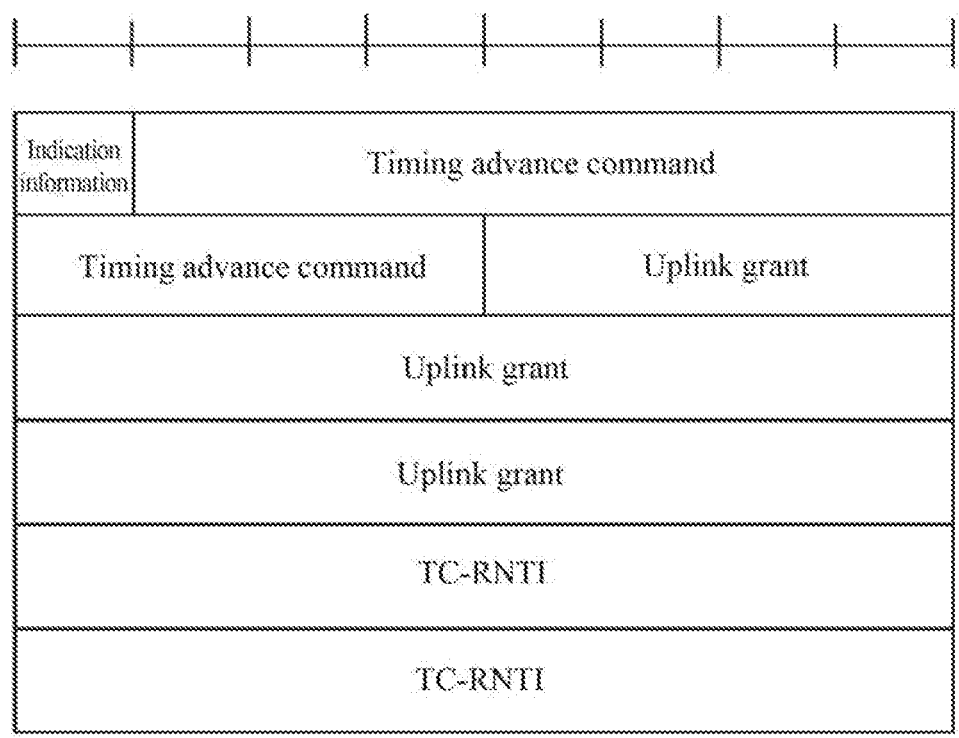
FIG. 8 is a schematic block diagram of carrying indication information in a MAC RAR according to an implementation of the present disclosure.

For example, as shown in FIG. 8, the first MAC RAR may include indication information (e.g., 1 bit), a Timing advance command, an uplink grant, and a temporal cell radio network temporary identifier (TC-RNTI).

Herein, the Timing advance command is used for specifying time adjustment amount required for uplink synchronization of the terminal device, and it may occupy 11 bits. The UL grant specifies uplink resources allocated to the Msg3. When there is uplink data transmission, for example, conflicts need to be resolved, the grant allocated by the network device in the RAR cannot be less than 56 bits. The TC-RNTI is used for subsequent transmission of the terminal device and network device. After the conflict is resolved, this value may become a C-RNIT.

It should be understood that the above-mentioned implementations are merely exemplary descriptions, and implementations of the present disclosure are not limited thereto.

The main purpose of the implementations of the present disclosure is to avoid a case where two carriers multiplex the RAR.

Figure 9:
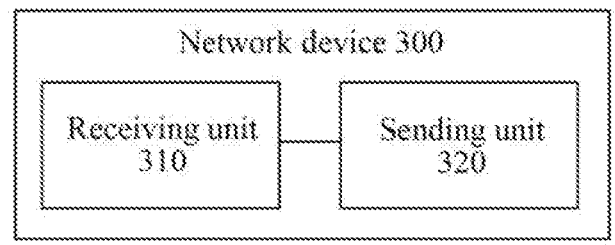
FIG. 9 is a schematic block diagram of a network device according to an implementation of the present disclosure.

FIG. 9 is a schematic block diagram of a network device according to an implementation of the present disclosure.

Specifically, as shown in FIG. 9, the network device 300 includes a receiving unit 310 and a sending unit 320.

The receiving unit 310 is configured to receive a first preamble sent by a terminal device on a first uplink carrier or a second uplink carrier, wherein a frequency point of the first uplink carrier is different from a frequency point of the second uplink carrier.

The sending unit 320 is configured to send a media access control (MAC) protocol data unit (PDU) to the terminal device, wherein the MAC PDU includes a first MAC random access response (RAR) corresponding to the first preamble.

Optionally, an index number of a preamble transmittable on the first uplink carrier has no intersection with an index number of a preamble transmittable on the second uplink carrier.

Optionally, the MAC PDU include indication information for indicating that the first MAC RAR is an RAR corresponding to the first preamble sent on the first uplink carrier, or indication information for indicating that the first MAC RAR is an RAR corresponding to the first preamble sent on the second uplink carrier.

Optionally, the MAC PDU includes a MAC header carrying the indication information.

Optionally, the MAC header includes a backoff indicator (BI) subheader carrying the indication information.

Optionally, the MAC header includes a random access preamble identifier (RAPID) subheader carrying the indication information.

Optionally, the MAC header includes a backoff indicator (BI) subheader.

Optionally, the BI subheader includes a first BI and/or a second BI; the first BI is used for indicating waiting time before the terminal device re-sends a preamble on the first uplink carrier, and the second BI is used for indicating waiting time before the terminal device re-sends a preamble on the second uplink carrier.

Optionally, the MAC PDU includes a first MAC RAR carrying the indication information.

Optionally, a random access radio network temporary identifier (RA-RNTI) corresponding to a physical random access channel (PRACH) resource on the first uplink carrier has no intersection with an RA-RNTI corresponding to a PRACH resource on the second uplink carrier.

Figure 10:
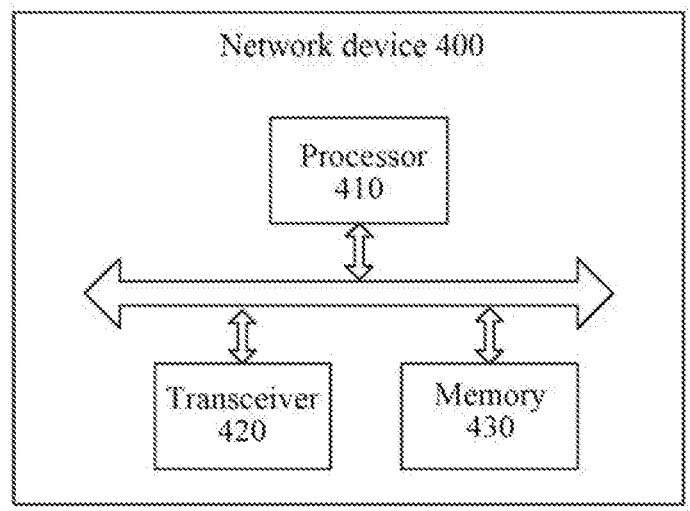
FIG. 10 is a schematic diagram of another network device according to an implementation of the present disclosure.

It should be noted that both the receiving unit 310 and the sending unit 320 may be implemented by a transceiver, and the processing unit may be implemented by a processor. As shown in FIG. 10, a network device 400 may include a processor 410, a transceiver 420, and a memory 430. The memory 430 may be used for storing indication information, or may be used for storing codes, instructions, etc., executed by the processor 410. The various components in the network device 400 are connected by a bus system. The bus system includes a power bus, a control bus and a status signal bus in addition to a data bus.

The network device 400 shown in FIG. 10 can implement the various processes implemented by the network device in the method implementation of FIG. 2 described above. In order to avoid duplication, the details will not be repeated here.

Figure 11:
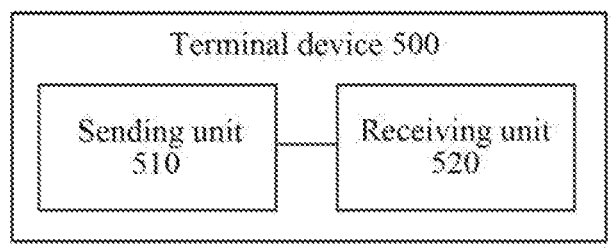
FIG. 11 is a schematic block diagram of a terminal device according to an implementation of the present disclosure.

FIG. 11 is a schematic block diagram of a terminal device according to an implementation of the present disclosure.

Specifically, as shown in FIG. 11, the device 500 includes a sending unit 510 and a receiving unit 520.

The sending unit 510 is configured to send a first preamble to a network device on a first uplink carrier or a second uplink carrier, wherein a frequency point of the first uplink carrier is different from a frequency point of the second uplink carrier.

The receiving unit 520 is configured to receive a media access control (MAC) protocol data unit (PDU) sent by a network device, wherein the MAC PDU includes a first MAC random access response (RAR) corresponding to the first preamble.

Optionally, an index number of a preamble transmittable on the first uplink carrier has no intersection with an index number of a preamble transmittable on the second uplink carrier.

Optionally, the MAC PDU include indication information for indicating that the first MAC RAR is an RAR corresponding to the first preamble sent on the first uplink carrier, or indication information for indicating that the first MAC RAR is an RAR corresponding to the first preamble sent on the second uplink carrier.

Optionally, the MAC PDU includes a MAC header carrying the indication information.

Optionally, the MAC header includes a backoff indicator (BI) subheader carrying the indication information.

Optionally, the MAC header includes a random access preamble identifier (RAPID) subheader carrying the indication information.

Optionally, the MAC header includes a backoff indicator (BI) subheader.

Optionally, the BI subheader includes a first BI and/or a second BI; the first BI is used for indicating waiting time before the terminal device re-sends a preamble on the first uplink carrier, and the second BI is used for indicating waiting time before the terminal device re-sends a preamble on the second uplink carrier.

Optionally, the MAC PDU includes a first MAC RAR carrying the indication information.

Optionally, the terminal device further includes a processing unit configured to determine whether the first MAC RAR is a MAC RAR of the terminal device according to the indication information; when the first MAC RAR is the MAC RAR of the terminal device, perform a random access according to the first MAC RAR.

Optionally, a random access radio network temporary identifier (RA-RNTI) corresponding to a physical random access channel (PRACH) resource on the first uplink carrier has no intersection with an RA-RNTI corresponding to a PRACH resource on the second uplink carrier.

Figure 12:
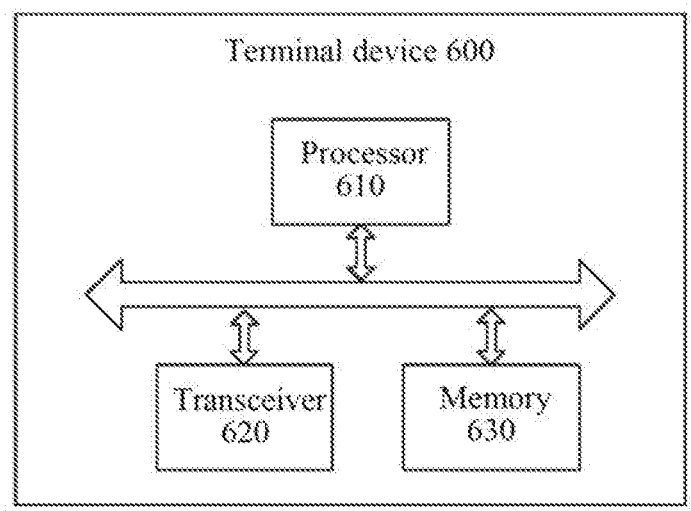
FIG. 12 is a schematic block diagram of another terminal device according to an implementation of the present disclosure.

It should be noted that both the sending unit 510 and the receiving unit 520 may be implemented by a transceiver, and the processing unit may be implemented by a processor. As shown in FIG. 12, a terminal device 600 may include a processor 610, a transceiver 620, and a memory 630. The memory 630 may be used for storing indication information, or may be used for storing codes, instructions, etc., executed by the processor 610. The various components in the terminal device 600 are connected by a bus system. The bus system includes a power bus, a control bus and a status signal bus in addition to a data bus.

The terminal device 600 shown in FIG. 12 can implement the various processes implemented by the terminal device in the method implementation of FIG. 2 described above. In order to avoid duplication, the details will not be repeated here.

It should be understood that the method implementations in implementations of the present disclosure may be applied to a processor or implemented by the processor.

In the implementation process, various acts of the method implementations in the implementations of the present disclosure may be completed by an integrated logic circuit of hardware in the processor or an instruction in the form of software. More specifically, the acts of the method disclosed in connection with the implementations of the present disclosure may be directly embodied as completion through the execution of a hardware decoding processor or completion through the execution in the combination of hardware and software modules in the decoding processor. Software modules may be located in a typical storage medium in the art, such as, a random access memory (RAM), a flash memory, a read-only memory, a programmable read-only memory, an electrical erasable programmable memory, or a register. The storage medium is located in the memory, and the processor reads information in the memory and completes the acts of the method in combination with its hardware.

Herein, the processor may be an integrated circuit chip with a capability for processing signals, and may implement various methods, acts and logic block diagrams disclosed in the implementations of the present disclosure. For example, the above processor may be a general purpose processor, a digital signal processor (DSP), an application specific integrated circuit (ASIC), a field programmable gate array (FPGA) or other programmable logic devices, a transistor logic device, or a discrete hardware component, or the like. Furthermore, the general purpose processor may be a microprocessor or the processor may be any conventional processor or the like.

In addition, the storage in implementations of the present disclosure may be a transitory memory or non-transitory memory, or may include both the transitory memory and the non-transitory memory. The non-transitory memory may be a read-only memory (ROM), a programmable ROM (PROM), an erasable PROM (EPROM), an electrically erasable EPROM (EEPROM), or a flash memory. The transitory memory may be a Random Access Memory (RAM) which serves as an external cache. It should be understood that, the foregoing memory is an example for illustration and should not be construed as limiting. For example, optionally, the memory in the implementations of the present disclosure may be a Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), Direct Rambus RAM (DR RAM), or the like. That is, memories in the systems and methods described herein are intended to include, but are not limited to, these and any other suitable types of memories.

Finally, it should be noted that the terms used in the implementations of the present disclosure and the appended claims are for the purpose of describing specific implementations only and are not intended to limit the implementations of the present disclosure.

For example, the singular forms "a", "said", and "the" used in the implementations of the present disclosure and the appended claims are also intended to include the plural forms unless the context clearly indicates other meanings.

For another example, depending on the context, the word "when" as used herein may be interpreted as "if" or "whether" or "while" or "in response to a determination of/that" or "in response to a detection of/that". Similarly, depending on the context, the phrase "if determined" or "if detected (a stated condition or event)" may be interpreted as "when . . . is determined" or "in response to a determination" or "when (stated condition or event) is detected" or "in response to a detection of (stated condition or event)".

Those of ordinary skill in the art will recognize that the exemplary units and algorithm acts described in connection with the implementations disclosed herein may be implemented in electronic hardware, or a combination of computer software and electronic hardware. Whether these functions are implemented in hardware or software depends on a specific application and design constraint of the technical solution. One skilled in the art may use different methods to implement the described functions for each particular application, but such implementation should not be considered to be beyond the scope of implementations of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed systems, apparatuses and methods may be implemented in other ways. For example, the device implementations described above are only illustrative, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The units described as separated components may or may not be physically separated, and the component shown as a unit may or may not be a physical unit, i.e., it may be located in one place or may be allocated over multiple network units. Parts or all of the units can be selected according to actual needs to achieve the purpose of the implementations of the present disclosure.

In addition, various functional units in the implementations of the present disclosure may be integrated in one processing unit, or various units may be presented separately in a physical way, or two or more units may be integrated in one unit.

The function units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product stored in a storage medium, including several instructions for causing a computer device (which may be a personal computer, a server, or a network device, etc.) to perform all or parts of the acts of the methods described in various implementations of the present disclosure. The aforementioned storage medium includes a medium capable of storing program codes, such as, a U disk, a mobile hard disk, a random access memory (RAM), a magnetic disk or an optical disk, etc.

What are described above are merely the specific implementations of the implementations of the present disclosure, but the protection scope of the implementations of the present disclosure is not limited thereto. Any change or substitute that can be easily conceived by a person skilled in the art within the technical scope disclosed by the implementations of the present disclosure shall be included within the protection scope of the implementations of the present disclosure. Therefore, the scope of protection of the implementations of the present disclosure should be subject to the scope of protection of the claims.

What is claimed is:

1. A method for contention-based random access, comprising:
    sending, by a terminal device, a first preamble to a network device on a first uplink carrier or a second uplink carrier, wherein a frequency point of the first uplink carrier is different from a frequency point of the second uplink carrier;
    receiving, by the terminal device, a media access control (MAC) protocol data unit (PDU) sent by the network device, wherein the MAC PDU comprises a first MAC random access response (RAR) corresponding to the first preamble,
    wherein a first random access radio network temporary identifier (RA-RNTI) corresponding to a first physical random access channel (PRACH) resource on the first uplink carrier has no intersection with a second RA-RNTI corresponding to a second PRACH resource on the second uplink carrier, such that the terminal device is capable of distinguishing the first uplink carrier and the second unlink carrier upon receiving the first MAC RAR, and wherein the MAC PDU comprises indication information for indicating that the first MAC RAR is an RAR corresponding to the first preamble, and the MAC PDU comprises a MAC header, and the MAC header comprises a random access preamble identifier, RAPID, subheader carrying the indication information, wherein the terminal devices receives the same MAC PDU with different preamble indexes, wherein the preamble indexes includes a first preamble index belong to a first preamble sequence and a second preamble index belong to a second preamble sequence, and wherein the first preamble sequence corresponds to the first RA-RNTI, and the second preamble sequence corresponds to the second RA-RNTI; and
    determining, by the terminal device, that the first MAC RAR is the RAR corresponding to the first preamble based on the indication information.

2. The method of claim 1, wherein the MAC header comprises a backoff indicator (BI) subheader.

3. A network device, comprising:
    a transceiver, configured to receive a first preamble sent by a terminal device on a first uplink carrier or a second uplink carrier, wherein a frequency point of the first uplink carrier is different from a frequency point of the second uplink carrier; and to send a media access control (MAC) protocol data unit (PDU) to the terminal device, wherein the MAC PDU comprises a first MAC random access response (RAR) corresponding to the first preamble,
    wherein a first random access radio network temporary identifier (RA-RNTI) corresponding to a first physical random access channel (PRACH) resource on the first uplink carrier has no intersection with a second RA-RNTI corresponding to a second PRACH resource on the second uplink carrier, such that the terminal device is capable of distinguishing the first uplink carrier and the second unlink carrier upon receiving the first MAC RAR, and wherein the MAC PDU comprises indication information for indicating that the first MAC RAR is an RAR corresponding to the first preamble, and the MAC PDU comprises a MAC header, and the MAC header comprises a random access preamble identifier, RAPID, subheader carrying the indication information, wherein the terminal devices receives the same MAC PDU with different preamble indexes, wherein the preamble indexes includes a first preamble index belong to a first preamble sequence and a second preamble index belong to a second preamble sequence, and wherein the first preamble sequence corresponds to the first RA-RNTI, and the second preamble sequence corresponds to the second RA-RNTI; and
    wherein the transceiver is configured to determine that the first MAC RAR is the RAR corresponding to the first preamble based on the indication information.

4. The network device of claim 3, wherein an index number of a preamble transmitted on the first uplink carrier and an index number of a preamble transmitted on the second uplink carrier have no intersection.

5. The network device of claim 4, wherein the index number of the preamble transmitted on the first uplink carrier and the index number of the preamble transmitted on the second uplink carrier are configured in a system broadcast.

6. A terminal device, comprising:
a transceiver, configured to send a first preamble to a network device on a first uplink carrier or a second uplink carrier, wherein a frequency point of the first uplink carrier is different from a frequency point of the second uplink carrier; and to receive a media access control (MAC) protocol data unit (PDU) sent by the network device, wherein the MAC PDU comprises a first MAC random access response (RAR) corresponding to the first preamble, wherein a first random access radio network temporary identifier (RA-RNTI) corresponding to a first physical random access channel (PRACH) resource on the first uplink carrier has no intersection with a second RA-RNTI corresponding to a second PRACH resource on the second uplink carrier, such that the terminal device is capable of distinguishing the first uplink carrier and the second unlink carrier upon receiving the first MAC RAR, and wherein the MAC PDU comprises indication information for indicating that the first MAC RAR is an RAR corresponding to the first preamble, and the MAC PDU comprises a MAC header, and the MAC header comprises a random access preamble identifier, RAPID, subheader carrying the indication information, wherein the terminal devices receives the same MAC PDU with different preamble indexes, wherein the preamble indexes includes a first preamble index belong to a first preamble sequence and a second preamble index belong to a second preamble sequence, and wherein the first preamble sequence corresponds to the first RA-RNTI, and the second preamble sequence corresponds to the second RA-RNTI;
wherein the transceiver is configured to determine that the first MAC RAR is the RAR corresponding to the first preamble based on the indication information.

7. The terminal device according to claim 6, wherein the MAC PDU comprises a MAC header carrying the indication information.

8. The terminal device of claim 7, wherein the MAC header comprises a backoff indicator (BI) subheader carrying the indication information.

9. The terminal device of claim 6, wherein the MAC header comprises a backoff indicator (BI) subheader.

10. The terminal device of claim 9, wherein the BI subheader comprises a first BI and/or a second BI; the first BI is used for indicating waiting time before the terminal device re-sends a preamble on the first uplink carrier, and the second BI is used for indicating waiting time before the terminal device re-sends a preamble on the second uplink carrier.

11. The terminal device of claim 6, wherein the terminal device further comprises a processor, configured to:
determine whether the first MAC RAR is a MAC RAR of the terminal device according to the indication information; and
perform a random access according to the first MAC RAR when the first MAC RAR is the MAC RAR of the terminal device.

* * * * *